United States Patent
Kram et al.

(10) Patent No.: US 9,517,579 B2
(45) Date of Patent: Dec. 13, 2016

(54) POLYSTYRENE MELT EXTRUSION PROCESS

(75) Inventors: Shari L. Kram, Midland, MI (US); Simon Lee, Midland, MI (US); William G. Stobby, Midland, MI (US); Ted A. Morgan, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 564 days.

(21) Appl. No.: 13/990,533

(22) PCT Filed: Nov. 22, 2011

(86) PCT No.: PCT/US2011/061859
§ 371 (c)(1),
(2), (4) Date: May 30, 2013

(87) PCT Pub. No.: WO2012/082332
PCT Pub. Date: Jun. 21, 2012

(65) Prior Publication Data
US 2013/0249135 A1    Sep. 26, 2013

Related U.S. Application Data

(60) Provisional application No. 61/424,289, filed on Dec. 17, 2010.

(51) Int. Cl.
*B29C 44/34* (2006.01)
*C08J 9/12* (2006.01)

(52) U.S. Cl.
CPC ............ *B29C 44/3403* (2013.01); *C08J 9/127* (2013.01); *C08J 2203/06* (2013.01); *C08J 2203/10* (2013.01); *C08J 2203/12* (2013.01); *C08J 2203/202* (2013.01); *C08J 2325/04* (2013.01); *C08J 2425/18* (2013.01)

(58) Field of Classification Search
CPC .................................................. B29C 44/3403
See application file for complete search history.

(56) References Cited

U.S. PATENT DOCUMENTS

| | | |
|---|---|---|
| 5,380,767 A | 1/1995 | Suh |
| 5,576,094 A | 11/1996 | Callens |
| 2012/0074347 A1* | 3/2012 | Gordon-Duffy ....... C08J 9/0019 252/62 |

FOREIGN PATENT DOCUMENTS

| | | |
|---|---|---|
| DE | 19932619 A | 1/2001 |
| WO | 2008/021417 A | 2/2008 |
| WO | 2008/021418 A | 2/2008 |
| WO | 2010/141400 A | 12/2010 |

* cited by examiner

*Primary Examiner* — Larry Thrower
(74) *Attorney, Agent, or Firm* — Gary C Cohn PLLC

(57) ABSTRACT

Extruded polystyrene foams are made with an added brominated styrene-butadiene polymer as a flame retardant. The blowing agent is a mixture of carbon dioxide, ethanol and water, which may also contain a $C_4$-$C_5$ hydrocarbon. The blowing agent mixture overcomes a tendency of the brominated styrene-butadiene to form very small cells. This allows the foam to expand fully to form good quality, low density extruded foam.

9 Claims, No Drawings

POLYSTYRENE MELT EXTRUSION PROCESS

This application claims benefit from U.S. Provisional Patent Application No. 61/424,289 filed 17 Dec. 2010.

The present invention relates to a melt extrusion process for styrene polymers.

Foam boards are made in large quantities from styrenic polymers in a melt extrusion process. It is usually necessary, when the boards are to be used in construction applications, that a flame retardant be incorporated into them. The most commonly used flame retardant for these foams is hexabromocyclododecane, but that material is facing regulatory pressure in various jurisdictions, in part because it is thought to bioaccumulate. Therefore, there is a desire to replace it.

One candidate for replacing hexabromocyclododecane is a brominated styrene-butadiene copolymer. Methods for making brominated styrene-butadiene copolymers that are useful as flame retardants for polystyrene foams are described, for example, in WO 2008/021417 and WO 2008/021418. The brominated styrene-butadiene flame retardants offer good performance at reasonable cost. They are not known to bioaccumulate.

However, the presence of the brominated styrene-butadiene polymer often has an adverse effect on the extrusion process. The cell size tends to be smaller when the brominated styrene-butadiene polymer is present when the foam is extruded, which suggests that the brominated polymer or some impurity within it is acting as a cell nucleator, producing a greater number of cells that would otherwise form. The smaller cells are less efficient at expanding the polymer mass as it exits the extruder die. As a result, the foam does not expand completely and the foam density tends to be somewhat higher than desired.

Higher foam densities increase production costs because more of the resin material is needed to produce a given volume of foam.

It is possible to decrease the foam density by increasing the blowing agent level, but this increases cost and can lead to the formation of large, uneven cells and an open cell structure. A uniform cell structure and a high proportion of closed cells are important for most board foams that are used as thermal insulation. Poor cell structure or large numbers of open cells can lead to a loss of mechanical strength and thermal insulation properties.

Therefore, it is desired to provide a means by which styrenic polymers can be formed into foam in a melt extrusion process in the presence of a brominated styrene-butadiene flame retardant, wherein the cell size and foam density are comparable to those of foams made using hexabromocyclododecane flame retardant.

The present invention is such a process. This invention is a process comprising forming a pressurized melt that contains a molten styrenic polymer, a flame retarding amount of a brominated styrene-butadiene polymer and a blowing agent mixture, and forcing the melt through an opening into a zone of lower pressure, where the blowing agent expands and the polymer cools and solidifies to form a foam, wherein the blowing agent mixture includes carbon dioxide, ethanol and water.

This blowing agent mixture produces board foam having a desirable density and a large, uniform cell structure with a high proportion of closed cells, despite the presence of the brominated styrene-butadiene copolymer.

The process of the invention can be performed in conventional foam extrusion equipment. Thus, single screw extruders, twin screw extruders and accumulating extrusion apparatus can all be used. Suitable processes for making extruded foams from resin/blowing agent mixtures are described in U.S. Pat. Nos. 2,409,910; 2,515,250; 2,669,751; 2,848,428; 2,928,130; 3,121,130; 3,121,911; 3,770,688; 3,815,674; 3,960,792; 3,966,381; 4,085,073; 4,146,563; 4,229,396; 4,302,910; 4,421,866; 4,438,224; 4,454,086 and 4,486,550. All of those processes are generally applicable for making foam according to this invention.

In the process, a blend of the styrenic polymer and the brominated styrene-butadiene polymer is heated to a temperature at or above the glass transition temperature of the styrenic polymer to form a melt. Suitable temperatures are at least 180° C., more typically at least 220° C., but preferably no greater than 280° C., and more preferably no greater than 260° C. The blowing agent mixture is introduced under pressure and mixed into the melt. Optional additives as described below are also blended into the melt. Pressures during the mixing step are maintained high enough so that foam expansion does not occur until the molten mixture passes out of the apparatus into a zone of reduced pressure.

After all components are blended, the molten mixture is usually adjusted to an extrusion temperature before being passed out of the apparatus (typically through an extrusion die) into the zone of reduced pressure. This temperature is typically in the range of from 105 to 135° C. As before, pressures during this step are suitably maintained so that the blowing agents do not expand.

Most commercial extrusion equipment has a series of separate heating zones which can operate independently at different temperatures. Typically, upstream zones where the components are mixed are operated at a higher temperature, and downstream cooling zones are set at lower temperatures to cool the melt to the extrusion temperature. A die chiller may be used to control temperature at the die head itself.

After the temperature of the molten mixture is adjusted to the extrusion temperature, the mixture is passed through an opening (typically an extrusion die) to an area of reduced pressure (usually atmospheric pressure). The loss of pressure causes the blowing agent to expand rapidly. The expansion of the blowing agent rapidly cools the molten polymer so it hardens as it expands, forming a stable foam.

The foam can be extruded into any variety of shapes, but will most commonly be extruded to form sheet (nominal thickness of 13 mm or less), plank (nominal thickness over 13 mm) or rod products. Plank products are conveniently made using a rectangular or "dog-bone" die. The invention has particular benefits when making plank products, especially plank products having a thickness of 20 mm or greater, because the problem of inadequate foam expansion when the cell sizes are small is greatest in those products.

The melt may be extruded through a die that has a multiplicity of orifices arranged such that contact between adjacent streams of the molten extrudate occurs during the foaming process. This causes the contacting surfaces to adhere to one another well enough to produce a unitary structure. Methods for forming such coalesced strand foams are described in U.S. Pat. Nos. 6,213,540 and 4,824,720, both incorporated herein by reference. These coalesced strand foams tend to be highly anisotropic, with the highest compressive strengths generally being observed in the extrusion direction. The coalesced strand foam may include missing strands or designed voids, as described in U.S. Pat. No. 4,801,484, incorporated by reference herein.

The styrenic polymer is a thermoplastic polymer or copolymer of styrene that contains at most 0.1% by weight bromine and preferably contains no bromine. Most preferred are polystyrene homopolymers, and copolymers of styrene with ethylene, propylene, acrylic acid, maleic anhydride, and/or acrylonitrile. Polystyrene homopolymer is most preferred.

The styrenic polymer should have a molecular weight high enough to allow for melt processing. Generally, a weight average molecular weight of at least 10,000 is adequate, but a preferred weight average molecular weight is at least 50,000. The weight average molecular weight may be up to 500,000 or up to 350,000. For purposes of this invention, polymer molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, or equivalent device with tetrahydrofuran (THF) or other suitable solvent flowing at a rate of 1 mL/min and heated to a temperature of 35° C. as the eluent.

The brominated styrene-butadiene polymer preferably contains at least 10% by weight bromine, and more preferably at least 50% by weight bromine. The bromine content may be as high as 60%, 65%, 70% or more. The bromine preferably is aliphatically bound. A preferred brominated styrene-butadiene polymer has little or no bromination on the aromatic rings. It is also preferred that the brominated styrene-butadiene polymer has little or no bromination at allylic or tertiary carbon atoms and contains few or no sites of hydrobromination (i.e. sites at which bromine and hydroxyl groups appear on adjacent carbon atoms). The presence of significant amounts of allylic or tertiary bromine and hydrobromination sites tends to reduce the thermal stability of the brominated styrene-butadiene polymer.

The aliphatic bromine-containing polymer is conveniently prepared by brominating a starting styrene-butadiene copolymer. The starting polymer suitably has a weight average molecular weight ($M_w$) within a range of from 5,000 to 400,000, preferably from 20,000 to 300,000, more preferably from 50,000 to 200,000 and even more preferably from 70,000 to 200,000.

The starting styrene butadiene polymer preferably contains at least 10% by weight of polymerized butadiene. Butadiene polymerizes to form mainly two types of repeating units. One type, referred to herein as "1,2-butadiene units" takes the form

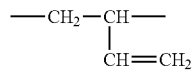

and so introduce pendant unsaturated groups to the polymer. The second type, referred to herein as "1,4-butadiene" units, takes the form —$CH_2$—CH=CH—$CH_2$— and introduces unsaturation into the main polymer chain. A starting styrene-butadiene polymer preferably contains at least some 1,2-butadiene units. Of the butadiene units in the starting styrene-butadiene polymer, at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the starting styrene-butadiene polymer. The proportion of 1,2-butadiene units may be in excess of 85% or even in excess of 90% of the butadiene units in the starting polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules,* 6, 129-133 (1973), and H. Ashitaka, et al., in *J. Polym. Sci., Polym. Chem.,* 21, 1853-1860 (1983).

Styrene-butadiene block copolymers are especially preferred. Such block copolymers contain one or more polystyrene blocks and one or more polybutadiene blocks. Among these are, diblock, triblock, star-branched, and multi-block copolymers are especially preferred. Among the useful starting styrene-butadiene block copolymers include those available from Dexco Polymers under the trade designation VECTORT™.

The starting styrene-butadiene polymer can be brominated by adding bromine across the carbon-carbon unsaturation of the butadiene units of the polymer. The bromination may be performed using a direct bromination process, in which the starting butadiene polymer is brominated with elemental bromine as described, e.g., in WO 2008/021418. An aliphatic alcohol may be present during the bromination reaction, also as described in WO 2008/021418. Residual bromine and other by-products can be removed from the resulting brominated styrene-butadiene copolymer solution, by extraction, washing, or other useful methods.

Alternatively, the starting styrene-butadiene copolymer may be obtained by brominating the starting polymer with a quaternary ammonium tribromide as described, for example, in WO 2008/021417. In a preferred such process, the starting polymer is contacted with the quaternary ammonium tribromide under conditions such that they react to produce a solution of the brominated styrene-butadiene polymer and a quaternary ammonium monobromide byproduct. The quaternary ammonium monobromide is preferably extracted with an aqueous phase containing a reducing agent to remove the quaternary ammonium monobromide stream from the brominated polymer.

It is preferred to brominate at least 60, 70, 75, 80 or 85% of the butadiene units of the starting polymer. Generally, higher levels of bromination are preferred, as this reduces the number of residual sites of aliphatic carbon-carbon unsaturation. Those residual unsaturation sites can polymerize during the foaming process to form gels that can lead to cosmetic defects or losses in mechanical properties. Up to 100% of the aliphatic carbon-carbon unsaturation sites may be brominated. A practical upper limit is generally up to 95%, up to 98% or up to 99%.

Preferably, enough of the brominated styrene-butadiene polymer is combined with the styrenic polymer to provide the blend with a bromine content within a range of from 0.1 percent by weight to 25 percent by weight, based upon blend weight. A preferred bromine content in the blend (provided by the brominated styrene-butadiene copolymer) is from 0.25 to 10 percent by weight, a more preferred amount is from 0.5 to 5 weight percent, and a still more preferred amount is from 1 to 3 weight percent. The amount of brominated styrene-butadiene polymer that is needed to provide a given bromine content to the blend will of course depend on its bromine content. In general, however, as little as about 0.15 parts by weight of the brominated styrene-butadiene polymer can be provided per 100 parts by weight of the styrenic polymer (0.15 pphr). At least 0.4 pphr or at least 0.8 pphr of the brominated styrene-butadiene polymer can be provided. Up to 100 pphr of the brominated styrene-butadiene polymer can be present in the blend, but a more preferred maximum amount is 50 pphr, a more preferred maximum amount is 20 pphr and a still more preferred maximum amount is 10 pphr or even 7.5 pphr.

The styrenic polymer and the brominated styrene-butadiene polymer are conveniently provided in the form of pellets or other small particulates, which are melted in the foam processing apparatus. The brominated styrene-butadiene polymer may be pre-blended with a portion of the styrenic polymer to form a masterbatch, which itself is conveniently formed into pellets or other particulates that are melted in the foam processing apparatus.

The blowing agent mixture includes carbon dioxide, ethanol and water. A preferred blowing agent includes carbon dioxide, ethanol, a $C_4$-$C_5$ hydrocarbon and water. The $C_4$-$C_5$ hydrocarbon is preferably isobutane.

The total amount of blowing agent is suitably an amount sufficient to provide the extruded foam with a foam density of no greater than 40 kg/m$^3$, more preferably no greater than 36 kg/m$^3$ and still more preferably no greater than 35 kg/m$^3$. These densities can be achieved with this invention when the total amount of blowing agent is within the range of from about 1.1 to about 1.8 moles of blowing agent per kilogram of the styrenic polymer. A preferred total amount of blowing agent is from 1.1 to about 1.70 moles per kilogram of the styrenic polymer. A still more preferred amount is from 1.15 to 1.65 moles per kilogram of the styrenic polymer.

Carbon dioxide is preferably used in an amount from about 0.5 to about 1.2, more preferably from 0.65 to about 0.9 moles per kilogram of the styrenic polymer. Ethanol is preferably used in an amount of from 0.15 to 0.5 moles, more preferably from 0.25 to 0.45 moles per kilogram of the styrenic polymer. Water is preferably used in an amount from about 0.1 to about 0.4 moles, more preferably from 0.1 to 0.3 moles, per kilogram of the styrenic polymer. The $C_4$-$C_5$ hydrocarbon is preferably present in an amount up to 0.35 moles, more preferably from 0.1 to 0.3 moles, per kilogram of the styrenic polymer.

A preferred blowing agent combination contains, per kilogram of the styrenic polymer, 0.65 to 0.9 moles of carbon dioxide, 0.25 to 0.45 moles of ethanol and from 0.1 to 0.3 moles of water, with the total amount of blowing agent being from 1.1 to 1.65 moles per kilogram of the styrenic polymer. A more preferred blowing agent combination contains, per kilogram of the styrenic polymer, 0.65 to 0.9 moles of carbon dioxide, 0.25 to 0.45 moles of ethanol, 0.1 to 0.3 moles of isobutane and from 0.1 to 0.3 moles of water, with the total amount of blowing agent being from 1.15 to 1.65 moles per kilogram of the styrenic polymer.

Various auxiliary materials can be used in the foaming process. Common such auxiliary materials include thermal stabilizers, nucleating agents, cell enlarging agents, foam stability control agents (permeability modifiers), antistatic agents, crosslinkers, processing aids (such as slip agents), ultraviolet absorbers, acid scavengers, dispersion aids, extrusion aids, antioxidants, colorants, inorganic fillers and the like.

Useful thermal stabilizers include alkyl phosphite compounds and epoxy compounds. Suitable alkyl phosphites are described in "Plastic Additive Handbook", edited by H. Zweifel, 5th Ed., p. 441 (2001). The alkyl phosphite compound contains at least one

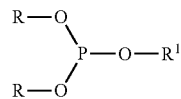

group, in which each R group is an unsubstituted or substituted alkyl group. The two R groups together may form a divalent group, which may be substituted, that bonds to the adjacent —O— atoms through aliphatic carbon atoms to form a ring structure that includes the —O—P—O— linkage. The R groups may be linear or branched. The carbon atom on each of the R groups that is adjacent to and bonded to ah adjacent —O— atom is preferably a methylene (—CH$_2$—) carbon. Substituent groups on the R groups may be, for example, aryl, cycloalkyl,

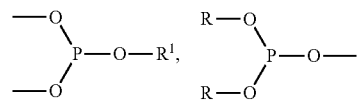

or an inert substituent. The R$^1$ group in the foregoing structures may be another R group, or an aryl or substituted aryl group. A preferred type of R$^1$ group is an aryl group that is substituted with at least one branched alkyl group that contains a tertiary carbon atom.

Specific examples of useful alkyl phosphites include bis(2,4-dicumylphenyl)pentaerythritol diphosphite, distearylpentaerythritol diphosphite and di(2,4-di-(t-butyl)phenyl)pentaerythritol diphosphite. These are commercially available as Doverphos™ S-9228 (Dover Chemical Corporation), Doverphos™ S-682 (Dover Chemical Corporation) and Irgafos™ 126 (Ciba Specialty Chemicals).

The alkyl phosphite compound is suitably present (if used) in an amount of at least 0.0015, preferably at least 0.0025, more preferably at least 0.005 and still more preferably 0.01 parts by weight of the alkyl phosphite per 100 parts by weight of the styrenic polymer. As much as 40 parts of the alkyl phosphite compound per 100 parts by weight of the styrenic polymer can be used, but preferably the alkyl phosphite is not present in an amount greater than 20 part, more preferably not greater than 8 parts, still more preferably not greater than 4 parts and even more preferably not greater than 2 parts per 100 parts by weight of the styrenic polymer.

Epoxy compounds that are useful as thermal stabilizers contain on average at least one and preferably two or more epoxide groups per molecule. The epoxy compound preferably has an equivalent weight per epoxide group of no more than 2000, preferably no more than 1000 and even more preferably no more than 500. The molecular weight of the epoxy compound is at least 1000 in preferred embodiments. The epoxy compound may be brominated. A variety of commercially available epoxy resins are suitable. These may be based, for example, on a bisphenol compound such as one of the various diglycidyl ethers of bisphenol A. They may be based on a brominated bisphenol compound. The epoxy compound may be an epoxy novolac resin or an epoxy cresol novolac resin. The epoxy compound may be an entirely aliphatic material, such as a diglycidyl ether of a polyether diol or an epoxidized vegetable oil. Examples of commercially available epoxy compounds that are useful herein include F2200HM and F2001 (from ICL Industrial Products), DEN 439 (from The Dow Chemical Company), Araldite ECN-1273 and ECN-1280 (from Huntsman Advanced Materials Americas, Inc.), and Plaschek 775 (from Ferro Chemical Co.).

The epoxy compound is suitably present (if used) in an amount of at least 0.005 parts and still more preferably at least 0.01 parts by weight per 100 parts by weight of the styrenic polymer. Such a blend may contain as much as 40 parts of the epoxy compound per 100 parts by weight of the styrenic polymer, but preferably the epoxy compound is not present in an amount greater than 20 parts, more preferably not greater than 8 parts, still more preferably not greater than 4 parts and even more preferably not greater than 2 parts per 100 parts by weight of the styrenic polymer.

Other stabilizers and/or acid scavengers can be present, in addition to the alkyl phosphite and the epoxy compound. Examples of such materials include, for example, inorganic materials such as tetrasodium pyrophosphate, hydrocalumite, hydrotalcite and hydrotalcite-like clays; polyhydroxyl compounds having a molecular weight of 1000 or below such as pentaerythritol, dipentaerythritol, glycerol, xylitol, sorbitol or mannitol, or partial esters thereof; and organotin stabilizers which may be allylophilic and/or dieneophilic. The organotin compounds include, for example, alkyl tin thioglycolates, alkyl tin mercaptopropionates, alkyl tin mercaptides, alkyl tin maleates and alkyl tin (alkylmaleates), wherein the alkyls are selected from methyl, butyl and octyl. Suitable organotin compounds are available commercially from Ferro Corporation (i.e., Thermchek™ 832, Thermchek™ 835), and Baerlocher GmbH (i.e., Baerostab™ OM 36, Baerostab™ M25, Baerostab™ MSO, Baerostab™ M63, Baerostab™ OM 710S).

Preferred nucleating agents include finely divided inorganic substances such as calcium carbonate, calcium silicate, indigo, talc, clay, mica, kaolin, titanium dioxide, silica, calcium stearate or diatomaceous earth, as well as small amounts of chemicals that react under extrusion conditions to form a gas, such as a mixture of citric acid or sodium citrate and sodium bicarbonate. The amount of nucleating agent employed may range from about 0.01 to about 5 parts by weight per hundred parts by weight of the styrenic polymer. The preferred range is from 0.1 to about 3 parts by weight, especially from about 0.25 to 0.6 parts by weight.

The product of the inventive process is a foam that preferably has a foam density from 24 to 40 kg/m$^3$, 30% or fewer, preferably 10% or fewer and even more preferably 5% or fewer open cells, per ASTM D6226-05. The density is more preferably no more than 36 kg/m$^3$ and still more preferably from 30 to 35 kg/m$^3$. The foam also preferably has a thickness of at least 13 mm and more preferably at least 20 mm, together with a density and open cell content as just mentioned. The foams preferably have an average cell size in the range of from 0.25 mm to 1.0 mm, especially from 0.25 to 0.5 mm, per ASTM D3576.

Boardstock foams made in accordance with the invention are useful as building foam insulation, as part of roof or wall assemblies. Other foams made in accordance with the invention can be used as decorative billet, pipe insulation and in molded concrete foundation applications.

The following examples are provided to illustrate the invention, but not to limit the scope thereof. All parts and percentages are by weight unless otherwise indicated.

COMPARATIVE SAMPLES A AND B, AND EXAMPLES 1-5

Comparative Sample A is illustrative of a prior art extrusion process in which hexabromocyclododecane is present as a flame retardant. A mixture of 88% by weight hexabromocyclododecane and 12% of an epoxy cresol novolac resin is blended with a general purpose grade polystyrene (PS-168 from Styron LLC) to form a pelletized concentrate containing 30% of the additives. This concentrate is then let down into more polystyrene (PS-640, from Styron LLC) on a single screw extruder. The concentrate and the polystyrene are fed into the extruder at rates which provide a mixture that contains 1.8% bromine by weight. The blowing agents are then added to the polymer mixture in a rotary mixer at a mixing temperature of 200° C. under enough pressure to prevent the blowing agent mixture from expanding. The resulting foamable composition is then cooled with heat exchangers and discharged through a slot die to form a foam. The blowing agent is a mixture of carbon dioxide, ethanol and isobutane as set forth in Table 1 below.

The resulting foam has an average cell size of 0.30 mm and a foam density of 35 kg/m$^3$. These values represent target values for the following experiments that substitute a brominated styrene-butadiene polymer flame retardant additive for the hexabromocyclododecane.

In Comparative Sample B, a brominated styrene-butadiene polymer is substituted for the hexabromocyclododecane. 50 parts of a brominated styrene-butadiene block copolymer is compounded into 50 parts of a general purpose-grade polystyrene resin (PS168 from Styron LLC) that contains 0.5 parts per hundred parts polystyrene (pphr) of an epoxy cresol novolac resin, 0.25 pphr of epoxidized soybean oil and 0.3 pphr of an alkyl phosphite antioxidant (Doverphos S9228, from Dover Chemicals) to form a 50% concentrate of the brominated block copolymer. The antioxidant package in this Sample is different from that used in Comparative Sample A, because of the difference in the flame retardant additive. The changes in antioxidant package are not known to effect the foaming characteristics.

The 50% concentrate is blended with more polystyrene and processed into foam in the same manner as described for Comparative Sample A. The proportions of the concentrate and the additional polystyrene are such that the foam contains 1.7% bromine.

Cell size in this case is only 0.18 mm. The smaller cell size is believed to be due at least in part to foam nucleation caused by the brominated styrene-butadiene polymer, or some impurity contained within it. The smaller cells are less efficient at expanding the foam. As a result, foam density is higher, at 36 kg/m$^3$.

Foam Examples 1-5 are made in the same way as Comparative Sample B, except the blowing agent is a mixture of carbon dioxide, ethanol, isobutene and water as set forth in Table 1. In each case, cell size is approximately the same as that of Comparative Sample A. Foam density in Examples 1-4 is slightly lower than Comparative Sample A.

TABLE 1

| Designation | Flame Retardant Additive[1] | Grams (moles) per kg of polymer[2] | | | | | Cell Size, mm | Foam Density (kg/m$^3$) |
| --- | --- | --- | --- | --- | --- | --- | --- | --- |
| | | CO$_2$ | EtOH | i-C4 | H$_2$O | Total | | |
| A* | HCBD | 35 (0.795) | 20 (0.435) | 8 (0.138) | 0 | 63 (1.368) | 0.30 | 35 |
| B* | Br-S/B | 35 (0.795) | 20 (0.435) | 8 (0.138) | 0 | 63 (1.368) | 0.18 | 36 |

TABLE 1-continued

| Designation | Flame Retardant Additive[1] | Grams (moles) per kg of polymer[2] | | | | | Cell Size, mm | Foam Density (kg/m³) |
| --- | --- | --- | --- | --- | --- | --- | --- | --- |
| | | CO₂ | EtOH | i-C4 | H₂O | Total | | |
| 1 | Br-S/B | 35 (0.795) | 20 (0.435) | 8 (0.138) | 2.5 (0.139) | 65.5 (1.507) | 0.30 | 34.5 |
| 2 | BR-S/B | 35 (0.795) | 20 (0.435) | 8 (0.138) | 5 (0.278) | 68 (1.646) | 0.31 | 34.0 |
| 3 | BR-S/B | 35 (0.795) | 15 (0.326) | 8 (0.138) | 2.5 (0.139) | 60.5 (1.408) | 0.36 | 32.1 |
| 4 | BR-S/B | 29 (0.659) | 15 (0.326) | 8 (0.138) | 2.5 (0.139) | 55.5 (1.262) | 0.66 | 35.0 |
| 5 | BR-S/B | 35 (0.795) | 9 (0.196) | 8 (0.138) | 2.5 (0.139) | 55.5 (1.272) | 0.38 | 36.5 |

*Not an example of the invention.
[1]HBCD is hexabromocyclododecane. BR-S/B is a brominated styrene-butadiene copolymer.
[2]CO₂ is carbon dioxide, EtOH is ethanol, i-C4 is isobutane and H₂O is water.

As seen in Table 1, the substitution of the brominated styrene-butadiene polymer for hexabromocyclododecane leads to a large decrease in cell size, when the same carbon dioxide/ethanol/isobutene blowing agent system is used (Comparative Sample A vs. Comparative Sample B). This leads to a loss in foam density. However, when a small amount of water is added to the blowing agent system, the cell size again becomes larger (Examples 1, 2 and 3) and the foam density is actually lower than the control.

Example 4 demonstrates that the beneficial effect of inventive blowing agent combination is not merely a matter of increasing the amount of blowing agent. In Example 4, less blowing agent (by weight and in terms of moles) is used than in either of the comparatives, yet cell size is acceptably large and the foam density is even lower than the controls.

Example 5 demonstrates the effect of decreasing the ethanol component of the blowing agent system of Example 4 (replacing it with an equal amount by weight of carbon dioxide). At this lower level of ethanol, a good cell size is maintained, although in this case the foam density is somewhat higher. The foam density is somewhat higher than Comparative Samples A and B, but this is believed to be due to the lower number of moles of blowing agent that are used in Example 5.

What is claimed is:

1. A process for making a polymer foam, comprising forming a pressurized melt that contains a molten styrenic polymer, a flame retarding amount of a brominated styrene-butadiene polymer and 1.1 to 1.70 moles of a blowing agent mixture per kilogram of the styrenic polymer, and forcing the melt through an opening into a zone the blowing agent expands and the polymer cools and solidifies to form a foam, wherein the blowing agent mixture includes 0.65 to about 0.9 moles of carbon dioxide per kilogram of the styrenic polymer, 0.25 to 0.45 moles of ethanol per kilogram of the styrenic polymer, 0.1 to 0.3 moles of a $C_4$-$C_5$ hydrocarbon per kilogram of the styrenic polymer and 0.1 to 0.3 moles of water per kilogram of the styrenic polymer, wherein the average cell size of the foam is from 0.25 mm to 1 mm.

2. The process of claim 1, wherein the $C_4$-$C_5$ hydrocarbon is isobutene.

3. The process of claim 1 wherein the amount of blowing agent mixture is from 1.15 to 1.65 moles per kilogram of the styrenic polymer.

4. The process of claim 1 wherein the blowing agent mixture contains, per kilogram of the styrenic polymer, 0.65 to 0.9 moles of carbon dioxide, 0.25 to 0.45 moles of ethanol, 0.1 to 0.3 moles of isobutane and from 0.1 to 0.3 moles of water, with the total amount of blowing agent mixture being from 1.15 to 1.65 moles per kilogram of the styrenic polymer.

5. The process of claim 1 wherein the foam density is no greater than 36 kg/m³.

6. The process of claim 1 wherein the foam has an open cell content of no greater than 30%.

7. The process of claim 1 wherein the foam has a thickness of at least 12 mm.

8. The process of claim 1 wherein the foam has a thickness of at least 20 mm.

9. The process of claim 1 wherein the brominated styrene-butadiene polymer is a brominated block copolymer of styrene and butadiene which contains at least 50% by weight bromine.

* * * * *